US006872459B1

(12) United States Patent
Frisk et al.

(10) Patent No.: US 6,872,459 B1
(45) Date of Patent: Mar. 29, 2005

(54) LAMINATED PACKAGING MATERIAL AND METHOD FOR PRODUCING THE SAME

(75) Inventors: Peter Frisk, Tokyo (JP); Norio Kobayashi, Tokyo (JP); Hiroaki Ogita, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/088,353

(22) PCT Filed: Sep. 18, 1999

(86) PCT No.: PCT/JP99/05035

§ 371 (c)(1),
(2), (4) Date: Jul. 19, 2002

(87) PCT Pub. No.: WO01/19611

PCT Pub. Date: Mar. 22, 2001

(51) Int. Cl.$^7$ ............... B32B 27/06; B32B 27/08; B32B 27/28; B32B 27/34; B32B 27/36
(52) U.S. Cl. ............... 428/474.4; 428/474.7; 428/474.9; 428/475.2; 428/475.5; 428/475.8; 428/476.3; 428/500; 428/507; 428/511; 428/515; 428/537.5
(58) Field of Search ............... 428/474.4, 474.7, 428/474.9, 475.2, 475.5, 475.8, 476.3, 500, 507, 511, 515, 537.5

(56) References Cited

U.S. PATENT DOCUMENTS 5,413,845 A * 5/1995 Lofgren et al. ............. 428/215
6,436,547 B1 * 8/2002 Toft et al. ................ 428/474.4

FOREIGN PATENT DOCUMENTS

| JP | 6-80873 A | 3/1994 |
| JP | 6-262739 A | 9/1994 |
| JP | 9-58650 A | 3/1997 |
| JP | 9-277456 A | 10/1997 |
| JP | 9-278953 A | 10/1997 |
| JP | 11-49140 A | 2/1999 |

* cited by examiner

Primary Examiner—Nathan M. Nutter
(74) Attorney, Agent, or Firm—Burns, Doane, Swecker & Mathis, L.L.P.

(57) ABSTRACT

This invention relates to the laminated material for food packaging, and its manufacturing process. The laminated material (10) consists of the quality keeping intermediate layer (12) laminated inside the paper core layer (11) and the core layer and the heat sealable innermost layer (13). The quality keeping intermediate layer comprises of an extrusion coatable blend polymer consisting of polymer component A 50–95% of nylon-MXD6 or EVOH and, polymer component B 5–50% of nylon 6, nylon 6, the blends or PET. The quality keeping intermediate layer is extruded and laminated directly in the core layer, the innermost layer contains at least the linear low density polyethylene which has a narrow molecular weight distribution, and has the properties parameter of mean density of 0.910–0.925, 100–122 degrees C. peak melting point, melt flow index of 5–20, swelling ratio (SR) of 1.4–1.6, and 5–50 micrometer layer thickness.

The hardness, production efficiency, and cost performance of the barrier packaging container formed by the packaging material are improved.

11 Claims, 3 Drawing Sheets

LAMINATED PACKAGING MATERIAL AND METHOD FOR PRODUCING THE SAME

TECHNICAL FIELD

This invention relates to a laminated packaging material which consists of a core layer, such as paper or paper board, a quality keeping layer containing nylon-MXD6 (meta-xylene diamine-abipic acid condensation polymer) which is extrusion-coated and laminated on the inner surface of the core layer, and an innermost layer containing heat sealable linear low density polyethylene with a narrow molecular weight distribution, and the method of manufacturing of the packaging material.

BACKGROUND ART

A flexible packaging laminated material is used over many years for liquid food packaging. The packaging container for milk, juice, Japanese sake, white distilled liquor, mineral water, and other drinks is manufactured according to the following steps to the container of the final shape: The step of forming the web shape packaging material which has crease lines in fibrous substrates (for example, paper etc.)/plastic laminate by the longitudinal seal in the long direction at the tube shape, the step of being filled with liquid food in the packaging material formed to the tube shape, the step of traversal sealing in the transversal direction of tube shape packaging material, the step of forming in first shape like a cushion or a pillow, the step of cutting separately at fixed spacing when packaging material is a web shape, the step of folding along with a crease line. The final shape includes a brick shape (parallelepipedic shape), a hexagon column, an octagon column, a decagon column, tetrahedron shape, etc. The material of a fibrous substrate is a paper board in many cases.

The paper packaging container of a gable top shape is obtained according to steps in which paper packaging material is cut in predetermined shape, the blanks which sealed to container lengthwise is obtained, after sealing the bottom of the blanks in a filling machine, the container is filled with the drink of cow's milk and juice from up opening, and the upper part is sealed. The appearance design of a packaging product is printed on the front face of the packaging material.

As for the conventional laminated packaging material used for the paper packaging product, low density polyethylene (LDPE)/printing ink layer/paper core layer (fibrous carrier layer)/LDPE/aluminum foil (gas barrier layer)/LDPE/LDPE, LDPE/printing ink layer/paper core layer/LDPE/LDPE, printing ink layer/LDPE/paper core layer/LDPE/LDPE, LDPE/printing ink layer/paper core layer/LDPE/aluminum foil/polyester (PET), etc. are known. They are actually used widely now.

Generally the above-mentioned laminate for packaging is manufactured according to the steps in which the raw-paper roll of a paper core layer is carried in to a printing machine, the raw-paper side is printed, the printed paper is again wound around a roll shape, the paper is sent to an extrusion laminator from the roll, and fused polyolefin (for example, LDPE etc.) are extruded from an extruder to the raw-paper side, when gas barrier layers (aluminum foil etc.) are included, the fused polyolefin is extruded with lamination coating also between the gas barrier layer. When laminating the above gas barrier layers or adding the functional layer of further others, no layers are laminated at once, but separately, partial laminates are prepared, respectively, and are temporarily made into a roll shape, subsequently the partial laminate is laminated, and the final laminate has been obtained.

As for each layer of the above-mentioned laminate for packaging, each has each function and feature. Plastic coating for liquid tight is formed in the both-sides of the fibrous core layer of paper or paper board formed to a packaging container. The plastic coating protects a liquid absorption fibrous core layer from the osmosis by the moisture effectively. The laminated outside layer usually gives the outstanding heat sealability to the packaging material, and consists of thermoplastic matter, such as a low-density polyethylene, as mentioned above.

However, the laminated packaging material which consists only of paper or the paper board, and the above-mentioned thermoplastic outside layer is lacked in a mechanical strength, and is inferior to the barrier against the gas (especially oxygen gas) from the outside of a container. When liquid food is fruit juice of citrus fruits etc. and is preserved in ordinary temperature at a long period of time, the non-scalping and oxygen barrier for the perfume and flavor are needed in packaging. Since oxygen penetrates through the wall of the carton, the liquid food loses the above-mentioned nutritional value. Usually a gas barrier layer is added to a laminate for reduction of permeation of the oxygen to carton, and minimization of degradation of a nutrient like vitamin C.

As mentioned above, in order to maintain the quality of a contents product, a function of preventing that the aroma flavor of a contents product etc. penetrates packaging material, and leaks outside, and a function of preventing that the packaging material in contact with a contents product absorbs the aroma, flavor, etc. or, the non-scalping of preventing a foreign matter etc. oozing out for a contents product from packaging material, and injuring the aroma, flavor, etc., the gas barrier which protects the contents product from the gas (oxygen gas etc.) which injures the quality of contents product in the laminated material wall of a packaging container is needed for packaging material. The packaging material, which fully has the function, a non-scalping, and a gas barrier, is desirable.

The material with the excellent oxygen gas barriers, such as aluminum, foil, EVOH (polyethylene vinyl alcohol) and PVOH (poly vinyl alcohol), and vapor deposited layer of inorganic oxide, is known as gas barrier material which gives the gas barrier to packaging material.

Furthermore, in about 10–4 degree C. refrigeration conditions, it is preferable that a quality storage term (shelf life) is extensible, in recent years. It is desirable to maintain the nutrition and quality of content products, such as vitamin C, after the storage for about 6–8 weeks in 7–4 degrees C., or at about 10–12 weeks or more in about 8 degrees C.

However, as for the conventional gas barrier material, the content of the product in a packaging container suffers damage from the some defects. Moreover, it is timely to substitute other gas barrier material for aluminum foil from a viewpoint of the environment and the recycling.

The aluminium foil is effective as a barrier material. Since use of an aluminium foil will seemingly bring the concern on the environment, the various attempts in which the practical alternative to an aluminium foil is developed have been made. The alternative has the barrier which was excellent in oxygen gas and aroma, and is easily scrapped after use.

Using the vapor deposited layer of an inorganic oxide for the packaging material for paper containers as an alternative of an aluminium foil was proposed (JP Y 05-28190, JP T 08-500068, and JP A 06-93120). By such packaging material, the paper container which has a gas (oxygen) barrier can be provided. However, they are not enough for the above-mentioned non-scalping or quality preservability. Since the vapor deposited layer of an inorganic oxide does not have mechanical strength but a vapor deposited substrate layer retains mechanical strength, unless the vapor deposited substrate layer is multi-functional material, it is necessary to make packaging material into an excessive layer structure. In the meaning, the amount of material of packaging material, the environmental load, and the manufacturing cost increase.

The barrier polymers, such as EVOH, PVOH, etc. as a gas barrier material of the package for food, are very sensitive to the moisture, and the barrier to oxygen gas is quickly lost in the damp atmospheres. Therefore, by another polymer, for example, the polyethylene layer having the water-impermeability, it is necessary to laminate the barrier layer so that gas barrier layers, such as EVOH and PVOH, may be surrounded. In manufacture of the packaging material which contains EVOH, PVOH, etc. as a gas barrier layer, it is necessary to constitute packaging material as a multilayer laminate which has two indispensable protection outer layers which enclose the gas barrier layer. The manufacturing cost is raised by the manufacture.

In order to give the barrier including non-scalping to packaging material or a film, many techniques of laminating polyamide (e.g. nylon) on packaging material or a film are proposed conventionally. (JP A 51-41078, JP A 58-160244, JP A 03-49953, JP A 04-179543, JP A 05-50562, JP A 05-261874, JP A 06-80873, JP A 06-305086, etc.)

JP A 51-41078 (Applicant: International Paper) indicates the laminate for paper containers which has the laminated structure of the polyethylene thermoplastic outermost layer/ paper substrate layer/nylon-film layer/polyethylene thermoplastic innermost layer.

JP A 58-160244 (Applicant: Asahi Chemical Industry) discloses the barrier paper container of which laminating structures are the barrier outside film containing nylon/ paper/barrier inner film containing nylon.

JP A 03-49953 (Applicant: Solvey) discloses the gas barrier laminating complex for containers which is laminated by the film (the condensation polymer of meta-xylene diamine and abipic acid (aliphatic alpha, omega-dicarboxylic acid), so-called nylon-MXD6) and the paper substrate. The condensation polyamide polymer of meta-xylene diamine and abipic acid is called "nylon-MXD6". The polymer is semi-crystalline polyamide. Compared with the conventional polyamide, the polymer has specially the excellent gas barrier to oxygen gas, high elongation, good bending strength, high tensile stress, high glass transition temperature, low coefficient of water absorption, etc.

JP A 04-179543 (Applicant: Dai Nippon Printing) proposes the barrier compound paper container of which the laminated structures are paper substrate layer// the above-mentioned nylon-MXD6 layer//adhesiveness polyolefine innermost layer, at least.

JP A 05-229070 (Applicant: Westvaco) discloses the packaging laminate of a paper-board supporting layer, and amorphous polyamide and heat sealable polyolefine innermost layer. The main faults of the packaging laminate are not having a good gas barrier by economical polymer layer thickness, when extending the shelf life. That is, a layer thickness is thick.

JP A 05-50562 (Applicant: Dai Nippon Printing) proposes the barrier compound paper container of which the lami nated structure is the paper substrate layer// semi-aromatic polyamide which comprises of copolymer of aliphatic polyamide component and aromatic-polyamide component.

JP A 05-261874 (Applicant: Okura Industrial) proposes the coextrusion multilayer packaging file which comprises the blend-polyamide-resin layer of xylene-diamine polyamide, such as nylon-MXD6, and other polyamide, such as nylon 6, modified polyolefine adhesive layer, and polyolefine layer.

JP A 06-80873 (Applicant: Ube Industries) proposes the resin composition for oxygen barrier packaging films which the stratified silicate (so-called nano clay) distributed uniformly to aliphatic polyamide resin and aromatic polyamide resin. The result of obtaining the resin composite (packaging container) having the toughness of aliphatic polyamide and the tensile properties, and the oxygen gas barrier of an aromatic polyamide and the nano clay is shown.

JP A 06-305086 (Applicant: Mitsubishi Chemical) indicates the paper container which comprises of biaxis-stretch film including the layer which comprises of a blend of aromatic polyamides, such as nylon-MXD6, and two aliphatic polyamide layers, and a paper layer.

JP A 06-305086 describes the laminate from the biaxis-stretch polyamide film and the paper layer, and the polyamide film consists of at least two polyamide layers and at least one layer including nylon-MXD6. By the dry lamination method or extruding lamination using an adhesive, the biaxisly-stretched film is laminated on a paper layer. The biaxis film is beforehand manufactured according to for example, the step of carrying out the blow film moulding, and then the step of laminating in other layers.

In the laminates obtained according to the steps, a urethane adhesive or an acrylic adhesive, polyester adhesive between the paper layer and the polyamide layer must be used. For producing the laminate, the steps need more and/or various materials, therefore result in a high production cost and heavy environmental load. Furthermore, probably the adhesion between the paper layer and the polyamide layer is not good in the laminate. The reason is that the surface of pre-manufactured film is hardened by oxidization and is not easily attached to the joint layer by extrusion. Since the pre-manufactured steps of the biaxial-stretched film are needed especially, in manufacture of the laminate, the method of manufacturing becomes more complicated and has a low cost performance.

Usually, the polyethylene of laminated material used in a liquid food paper packaging container is low density polyethylene (LDPE), and is the high-pressure-process low density polyethylene especially. The low-molecular-weight component contained in the high-pressure-process low density polyethylene of an innermost layer bleeds to the content in a paper packaging container, and when preserving at a long period of time, the taste of the content may change. In the ethylene alpha olefine copolymer obtained using a Ziegler catalyst, if lubricant is added in order to improve high seal temperature and inferior workability, the lubricant will bleed to a content product and will reduce the taste.

The paper-packaging container which uses the linear low density polyethylene (LLDPE) for an innermost layer is proposed (JP A 62-78059, JP A 60-99647, etc.). The linear low density polyethylene is very excellent in impact strength, tear strength, cold brittleness, heat-sealing reinforcement, hot tag nature, etc. However, since heat-sealing start temperature is somewhat high as compared with LDPE, EVA, or an ionomer, the linear low density polyethylene is inferior to converting properties.

On the other hand, the paper packaging container which uses the ethylene alpha olefine copolymer (so-called metallocene PE or mLLDPE) which polymerized with the metallocene catalyst for an innermost layer is proposed. (JP A 07-148895, JP A 08-337237, JP A 09-29868, JP A 09-52299, JP A 09-76435, JP A 09-142455, JP A 09-86537, JP A9-76375, etc.). The metallocene PE being applied to a container according to the low-temperature sealability, the film workability, and a narrow molecular weight distribution, is known (WO 93/08221, Reference "Plastic" vol. 44 No. 1, P60, Reference "Chemistry economy" vol. 39 No. 9, P48, Reference "Plastic" vol. 44 No. 10, P83). However, even though the metallocene PE has the low-temperature sealability and the low concentration of the low-molecular-weight component, an extrusion coating properties of all the metallocene PE in the case of packaging material manufacture is not necessarily shown, therefore the good performance is not shown in the converting properties. That is, practical extrusion coating cannot be obtained by use of the normal metallocene PE.

DISCLOSURE OF INVENTION

The purpose is offering the method of manufacturing of packaging laminated material excellent in the non-scalping and the gas barrier, in which practical extrusion coating of two or more basic layer to the paper core layer can convert packaging laminated material efficiently.

Moreover, the purpose of this invention is offering the paper packaging laminated material which can seal good within broad range of the seal temperature from elevated temperature to low temperature, therefore filling packaging to a paper packaging container is easy, and can heat seal quickly, and seals without the influence of the temperature of content products.

Furthermore, the purpose of this invention is offering the laminated packaging material which has possible extrusion coating, high cost performance, the outstanding container mechanical strength, the thin paper core layer, the low environmental load, and wide range heat-sealing temperature.

In a chilled preservation environment, another purpose of this invention is realizing the packaging material for manufacturing the packaging container which fits storage of fruits juice etc. especially, even ff the shelf life is extended at about 6–10 weeks.

The above purposes are realized by this invention.

The laminated packaging material of this invention is a laminated material for food packaging (10) which consists of at least a paper core layer (11), a quality keeping intermediate layer (12) laminated inside the core layer, and a heat sealable innermost layer (13).

The laminated packaging material of this invention is characterized by that the quality keeping intermediate layer consists of an extrusion-coatable blend polymer comprising 50–95% of polymer component A of the condensation polymer (nylon-MXD6) of meta-xylene diamine and abipic acid, or ethylene vinyl alcohol copolymer (EVOH) and, 5–50% of polymer component B of nylon 6 (PA-6), nylon-66 (PA-66), the blend (PA-6/66) with nylon 6 and nylon-66 or a polyethylene terephthalate (PET), the quality keeping intermediate layer is directly extruded and laminated on the core layer, and the innermost layer contains at least the linear low density polyethylene which has a narrow molecular weight distribution, and has the properties parameters of mean density of 0.910–0.925, 100–122 degrees C. peak melting point, melt flow index of 5–20, swelling ratio (SR) of 1.4–1.6 and 5–50-micrometer layer thickness.

In the desirable embodiment in this invention, the quality keeping intermediate layer's blend polymer comprises of the polymer component A of nylon-MXD6 and the polymer component B of nylon 6 (PA-6), nylon-66 (PA-66) and the blend (PA-6/66) with nylon 6 and nylon-66.

The blend polymer consists of nylon-MXD6 of 60–90 weight percent, more preferably 70–80 weight percent, and nylon-6 of 40–30 weight percent, more preferably 30–20 weight percent, in the still preferable embodiment in this invention.

The manufacturing method of this invention is the method of manufacturing the laminating material (10) for food packaging, which consists of at least the paper core layer (11), the quality keeping intermediate layer (12) laminated inside the core layer, and the heat sealable innermost layer (13).

The manufacturing method is characterized by extrusion-coating directly, on the core layer, the blend polymer of polymer component A 50–95% of the condensation polymer (nylon-MXD6) of meta-xylene diamine and abipic acid and, polymer component B 5–50% of nylon-6 (PA-6) or nylon-66 (PA-66) or the blend (PA-6/66) with nylon-6 and nylon-66 to laminate the quality keeping intermediate layer, and co-extruding the following sealable polymer with simultaneously above-mentioned blend polymer or, extruding the following heat sealable polymer after the extrusion-coating to laminate the heat sealable innermost layer (13):

the heat sealable polymer which contains at least the linear low density polyethylene which has a narrow molecular weight distribution, and has the properties parameters of mean density of 0.910–0.925, 100–122-degree C. peak melting point, melt flow index of 5–20, swelling ratio (SR) of 0.1.4–1.6, and 5–35-micrometer layer thickness.

In the desirable embodiment of the manufacturing method of this invention, the quality keeping intermediate layer of the blend polymer which contains the condensation polymer (nylon-MXD6) of meta-xylene diamine and abipic acid and nylon 6 (PA-6) is laminated on the core layer of paper or paper board and, the quality keeping intermediate layer is laminated on a core layer with a heat sealable innermost layer by the coextrusion coating.

Usually, the paper core layer, which can be used in this invention, is made from a kraft pulp, and has the outstanding reinforcement and outstanding low water absorptivity. The paper core layer includes bleached paper (FBL), unbleached paper (UBL), the duplex (DUPLEX) of un-bleach and bleach, clay coat paper, multilayer duplex (MB), etc. In this invention, any are sufficient.

The polyamide of the polymer component B includes nylon 6 (PA-6), nylon-66 (PA-66), or the blend (PA-6/66) with nylon 6 and nylon-66 etc. The properties can be customized by mixing the polyamide of the polymer component B, and nylon-MXD6 of the polymer component A. For example, the extrusion-coatable blend polymer has the improved elongation, and the improved sealability at the time of fracture. The elongation at the time of fracture of pure nylon-MXD6 is about 2–3%, and, on the other hand, the elongation of standard grade PA-6 is usually 400–600%. However, since the gas barrier is exponentially thinned by the amount of PA-6, too much PA-6 cause more inadequate gas barrier. In this invention, the examples of the polyamide of blend component B which can be used are nylon-6 (PA-6), PA-66, and the mixture (PA-6/66).

In this invention, the blend of nylon-MXD6 and the polyamide of the polymer component B is desirably the not uniformly mix blend. The blend shows a plurality (for example, two) of separate melting points or separated peaks by difference scanning calorie (DSC) measurement. The blend shows a plurality (e.g. two) of the melting peaks instead of a single melting peak. The blend means the blend with two or more phases (for example, two phases) having nylon-MXD6 of matrix. The not mixed blend has the merit of the improved tensile strength and the improved oxygen barrier.

In order to realize good mechanical properties such as bulging tolerance, seal intensity, and the character optimum about gas barrier, the containing ratio of nylon-MXD6 included in a quality keeping intermediate layer's blend polymer according to this invention is less than 95 wt. % from 50 wt. %, preferably 60 to 90 wt. % and more preferably 70 to 80 wt. %.

The blend with 80 wt. % nylon-MXD6 has the oxygen barrier characteristic better than 60 wt. % of the corresponding blend. The blend has the optimum balance between the gas barrier characteristic of the container for packaging, and mechanical properties by examination. In addition, by 90 wt. % or more of nylon-MXD6, the quality keeping intermediate layer is more weak, and becomes rigid, therefore crack and delamination may be caused.

The quality keeping intermediate layer of the packaging laminated material by this invention comprises of the extrusion-coatable blend polymer of the polymer component A of nylon-MXD6 or EVOH, and the polymer component B (PA-6, PA-66, PA-6/66, or PET). Furthermore, the blend with the polymer component A of EVOH and the polymer component B (PA-6, PA-66, or PA-6/66) and the blend with the polymer component A of nylon-MXD6 and the polymer component B of PET are also extrusion coatable, and the above is effective in the purpose achievement of this invention.

According to one desirable embodiment of this invention, the polyamide of the polymer component B is a "nylon clay hybrid" (NCH). The NCH is a molecule composite which consists of polyamide of for example, PA-6, PA-66, PA-6/66, etc., and the fine phyllosilicate distributed uniformly.

Preferably, the stratified silicate (phyllosilicate), which has the average particle diameter of 1–80 microns, and no particle diameter of 300 microns or more, is contained 0.1 to 10 wt. % in the quality keeping intermediate layer. The phyllosilicate is substantially distributed uniformly in the distance between layers of 50 Å or more.

In the embodiment, the fine phyllosilicate has one unit of the one side length of 0.002–1 micrometer and thickness of 6–20 Å. The distance between layers of the phyllosilicate means the distance between centers of one piece of the stratified silicate (phyllosilicate). Uniform distribution of the stratified silicate (phyllosilicate) means a state that, when the stratified silicate distributes in polyamide, the stratified silicate separates into every sheet, without the 50% or more forming a lump, the distance between layers of more than 100 Å is mutually kept in parallel and/or random, and the stratfied silicate is distributing to the numerator shape, and means the state that, in such state, 70% or more of the stratified silicate is more preferably.

For example, NCH is prepared by diffusing the argillite in a monomer and polymerizing in a polymerization process. The process generates very fine flake silicate having very fine structure and fully distributed in nylon polymer. The oxygen barrier and the excellent mechanical characteristics which have been improved can be obtained. The polyamide is indicated by "Journal of Applied Polymer Science, Vol. 49, 1259–1264 (1993)" and "Vol. 55, and 119–123 (1995)." The merit with PA-6 is the low price, and, on the other hand, NCH based on PA-6, PA-6, or PA-6/66 has the merit of giving an oxygen gas barrier quite better than the original polymer. Furthermore, NCH has a moisture barrier with good approximately twice from pure PA-6. The suitable example of NCH for the blend polymer of this invention is based by PA-6, and is commercially available (for example, Ube Industries, Ltd. make, Grade 1022CM1).

As raw material of the phyllosilicate, the stratified silicic acid mineral which consists of layers of magnesium silicate or aluminum silicate can be exemplified.

The blended amount of phyllosilicate has preferably 0.05–15 wt. % to the polymer, and 0.1–10 wt. % more preferably. Since the improvement effects such as oxygen barrier, the durability over stress, non-scalping, and quality maintenance are low, when the blended amount of phyllosilicate is less than 0.05 wt. %, the blended amount is not preferable.

Not only mechanical properties but the optimum gas barrier are obtained by mixing nylon-MXD6 with NCH based PA-6. The blend ratio of the expensive nylon-MXD6 can also be reduced, without losing the gas barrier. The blend with the large tolerance over the crack due to folding and forming, keeping of the airtight barrier layer, and the high elongation in fracture is obtained. For example, the blend of 75 wt. % of nylon-MXD6 and 25 wt. % of NCH-PA6 has the elongation at the time of 200% or more of fracture.

The phyllosilicate (clay mineral) which has between layers a metal ion (for example, metal ion chosen from Ag, Zn, Co, Cd, and Cu) except Na, K, Li, and calcium or its metal compound in the preferable embodiment of this invention can be used. The phyllosilicate has outstanding antibacterial to various microbes, such as a *pseudomonas aeruginosa, coliform bacillus*, and yellow *staphylococcus*. Therefore, antibacterial performance is also given to the packaging laminated material containing the phyllosilicate.

In the manufacture method of this antibacterial phyllosilicate, the antibacterial stratified silicate which contains metal ion is obtained by dissolving water-swelling argillite and the water-soluble metal salt chosen out of Ag, Zn, Co, Cd, and Cu in organic solvents, such as water, for example, methanol, and acetone, etc., dispersing, separating the deposit obtained, washing and drying. By another method, the antibacterial phyllosilicate which has metal hydroxide can be obtained from the deposit which trickles alkali solution into the above-mentioned distributed liquid, and is obtained.

The influence of the "bulging" of containers decreases by using NCH for polymer component B of the blend polymer containing nylon-MXD6. The "bulging" means the phenomenon in which the wall of a packaging container swells outside from the perpendicular plane between the corners of this packaging container. The improved resistance over the bulging by use of NCH is for the partial contribution to the rigid properties from NCH material. For example, the tensile stress of the tension of NCH-PA6 is about 830–880N/mm$^2$, on the other hand, in pure PA-6, it is only about 580 to 600 N/mm$^2$.

Furthermore, the moisture barrier of NCH is better than the moisture barrier of PA6. Since the appearance of the bulging of a packaging container gives the impression which is not good for consumers, reducing a bulging greatly has importance.

According to the preferable embodiment of the process by this invention, the packaging laminate which was well adapted for manufacture of the packaging container with which the seal has been improved can be offered. Furthermore, the process of the packaging laminate with the improved gas barrier, a high cost performance, and small environmental load is offered. The above-mentioned advantage is attained, without the tackiness of the adhesive polymer layer, by laminating the quality keeping intermediate layer directly on the core layer of paper or paper board by the coextrusion coating. Thus, according to adhesion/adhesion layer between the layers being unnecessary, the adhesion/adhesion material is saved, therefore provides an economical laminated article from the viewpoint of environmental resources reduction, easily recycling, and the reduction in cost.

"Extrusion-coating" means extruding and coating of the fused extrudable plastic layer to the substrate surface. The "extrusion coating" differs from the "lamination" which forms the lamination of a substrate layer/adhesive layer/film layer by extruding of a fused plastic adhesive layer between a substrate layer web and a pre-manufactured film layer. The "extrusion coating" differs from the lamination of the pre-manufactured film to the substrate.

The gas barrier properties of a three layers laminate of the nylon-MXD6-containing quality keeping intermediate layer coextrusion-coated to the paper core layer, the adhesive layer and the heat sealable innermost layer improves to about 30 to 40%.

It is also possible to coextrude three layer structures at one step to the paper core layer and to coextrude five layer structures on the paper board (paper core layer).

The gas barrier quality keeping intermediate layer, which comprises of the blend of nylon-MXD6, PA-6, or NCH, directly adheres the core layer of paper or paper board very well in quick line speed. Production of the laminate with high cost performance is attained.

Since various polyamide has various propertieses, it is not obvious to laminate the polymer to the paper core layer with direct extrusion coating. Amorphous polyamide is not adhered, in contrast to usually adhering PA-6 well to paper and paper board. As for good Junction and adhesion, the plastics layer means sealing and adhering in the paper board with large hardness according to aggregation into a paper board. Therefore, the destruction which appears in the delamination test does not take place between layers, but takes place within a paper-board layer. The above is observable by the phenomenon in which the delaminated plastics layer surface is being worn for paper fibers. Similarly, although the layer of the mixture of NCH, or PA-6 and NCH does not adhere to a paper board, nylon-MXD6 adheres to the fixed range. However, the adhesion between nylon-MXD6 and paper is weak. The layer of nylon-MXD6 is weak, and when the laminate is bent, the crack from paper board is generated by exfoliation.

Compared with the extrusion lamination in which the quality keeping intermediate layer is laminated in the core layer through adhesion layers such as polyethylene, the oxygen gas barrier is improved about 30 to 40% by direct extrusion coating of the quality keeping intermediate layer to the core layer. The reason may be because direct coating and laminating stimulated the equation of moisture between the core layer and the quality keeping intermediate layer. While the quality keeping intermediate layer is directly in contact with paper or the paper-board layer, the moisture from the content product of the packaging container which has permeated into the quality keeping intermediate layer is dispersed the core layer and the quality keeping intermediate layer. As one of the result of the, the ratio of the moisture which remains as a quality keeping intermediate layer is controled to a low level. The gas barrier is retained satisfactory in this case at a quality keeping intermediate layer.

Generally the increase in oxygen barrier properties is not applicable to all polyamide. The phenomenon is peculiar to nylon-MXD6, and the gas barrier properties of nylon-MXD6 usually decreases with high relative humidity at the time of packaging of a liquid food product.

The quality keeping intermediate layer can apply to any preferable thickness. However, for container packaging which prolongs a shelf life especially for fruits juice, according to the preferable embodiment of this invention, the quality keeping intermediate layer is applied in about 3–30 g/m$^2$, more desirably 4–12 g/m$^2$, the most desirably 5–8 g/m$^2$ to the core layer. In coating below 5 g/m$^2$, the barrier properties become inadequate. In coating beyond 8 g/m$^2$, the cost performance of the packaging laminate falls sharply.

On the side of the quality keeping intermediate layer of the opposite side of the core layer, a heat sealable innermost layer (13) is laminated directly. Or the heat sealable innermost layer (13) is laminated with the quality keeping intermediate layer by the adhesive polymer layer. The material of the heat sealable innermost layer contains at least the linear low-density polyethylene which has a narrow molecular weight distribution in this invention. The material has the properties parameters of mean density of 0.900–0.925 (preferably 0.905–0.910), 88–103 degrees C. (preferably 93–103 degrees C.) peak melting point, melt flow index of 5–20, swelling ratio (Swelling Ratio, SR) of 1.4–1.6, and 20–50 micrometers (preferably 20–30 micrometers) layer thickness.

The linear low-density polyethylene includes the blend polymer, which contains at least the linear low-density polyethylene (mLLDPE) having the narrow molecular weight distribution which is polymerized for example, using the metallocene catalyst. The ethylene-alpha-olefin copolymer obtained by polymerization using the metallocene catalyst can be used for the mLLDPE. To the activity point of the present catalyst being uneven and being called multi-site catalyst, since the activity point is uniform, the metallocene catalyst is also called single site catalyst.

As the alpha olefin of the co-monomer copolymerized with ethylene, butene-1, hexene-1,4-methyl pentene-1, and an octene-1 are included. The alpha olefin may be used independently and the mixture with other monomers may is used.

As the resin of mLLDPE, the ethylene-alpha-olefin copolymer polymerized using the metallocene catalyst, in detail, Tradename "Kernel" by Mitsubishi Chemical, Inc., Tradename "Evolue" by Mitsui Petrochemical Industries, Ltd., Tradename "EXACT" by U.S. EXXON CHEMICAL) company, Tradename "AFFINITY", "ENGAGE" by the U.S. Dow Chemical Co., etc., can be used.

In this invention, as long as the resin has the above-mentioned properties parameters, the resin other than mLLDPE resin can be used. Moreover, in pure mLLDPE, when it is difficult to obtain the above-mentioned properties parameter, other polymer components can be blended.

The above-mentioned "other polymer" includes the linear low density polyethylene (LLDPE) excellent in the tolerance (oil resistance, acid resistance, infiltration resistance, etc.) for the content, polyolefin resin, such as medium density polyethylene, polyethylene, polypropylene, and ethylene copolymer, thermoplastic resins, such as polyester resin, the conventional low density polyethylene (LDPE), etc.

The density of the blend low density polyethylene is 0.91–0.93 g/cm$^3$. Molecular weight is $1\times10^2$ to $1\times10^8$, and melt flow rate (MFR) is 0.1–20 g/10 min. In addition, an additive-free polymer is used usually. According to any use, various additives, such as an antioxidant, a ultraviolet absorber, an antistatic agent, a lubricant, an anti blocking agent, an inorganic/organic bulking agent, a coating material, and a pigment, can also be added suitably.

In this invention, the linear low-density polyethylene content polymer of the sealable innermost layer has the swelling ratio, SR of 1.4–1.6. The "swelling" means the phenomenon in which the cross-sectional area increases and the extrusion volume increases immediately after the polymer extruded comes out of the die/orifice. The swelling ratio in this invention means the transversal dimension (namely, expansion coefficient of diameter) of the polymer extruded from the die under the measurement conditions of the JIS examination method for melt-flow-rate (MFR) measurement.

In this invention, the linear low-density-polyethylene containing polymer of the sealable innermost layer has 100–122 degrees C. peak melting point. The above-mentioned parameter is a peak melting point by the differential scanning calorimetry. In the case of one peak, a peak melting point exceeds 115 degrees C., and a mean density is 0.920 or more. In the case of two or more peaks, one peak of them exceeds 115 degrees C., and mean density is 0.915 or more.

The blend polymer which consists of the ethylene-alpha-olefin copolymer polymerized with the metallocene catalyst and low density polyethylene polymerized with the multi-site catalyst has the narrow molecular weight distribution (Mw/Mn<=3) of the feature of an ethylene-alpha-olefin copolymer of having polymerized with the metallocene catalyst. The physical properties are the features which are excellent in tensile strength, impact strength-proof, tear strength, and low-temperature sealability, and are molecular large tangle further from the properties of high fused tension of the feature of low density polyethylene polymerized with the multi-site catalyst. Therefore, an impurity sealability is improved.

Moreover, concentration of additives, such as lubricant, can be made low because of the improved extrusion coating performance. The hindrance over sealable ability decreases and the feature of seal performance is optimized. Furthermore the influence of the taste and the component on the content by the additive is improved, and content protection performance does not drop from the outstanding seal performance.

The layer of the adhesive polymer laminated between the quality keeping intermediate layer and the heat sealable innermost layer includes for example, polyethylene (for example, Metallocene PE etc.) and ethylene-alpha-olefin copolymer, polypropylene, polybutene, polyisobutene, polyisobutylene, polybutadiene, polyisoprene, an ethylene-methacrylic-acid copolymer, or the copolymers of ethylene and unsaturated carboxylic acid, such as an ethylene-acrylic acid copolymer, or acid modified polyolefin resin, such as a carboxylic acid group modification, maleic-anhydride graft polyolefine, ethylene-ethyl acrylate copolymer, ionomer (IO) crosslinked by metal ion in between moleculars of ethylene-vinyl-methacrylate copolymer, ethylene-vinyl acetate copolymer (EVA) and etc. The thickness of the layer is 3–50 micro (preferably about 3–6 micro). Preferably, the adhesives layers of EVA or IO are layer thicknesses 3–6 micro. Moreover, the blend of the adhesive polymer and PE can also be instead used for the adhesion.

In the laminated material for packaging of this invention, the thermoplastic material laminated on the package material outside surface includes polyolefin resin, such as polyethylene, polypropylene, and an ethylene copolymer, as the outermost layer of the laminated material for packaging, for example. The thermoplastic material includes low density polyethylene (LDPE), linear low density polyethylene (LLDPE) excellent in the tolerance (oil resistance, acid resistance, infiltration resistance, etc.) over the content, conventional medium density polyethylene, and conventional coextrusion film of polyethylene. Preferably, the thermoplastic material is laminated with extrudtion-coating.

The purpose of the outermost layer and an innermost layer is protecting packaging material from the moisture osmosis of the inside and outside by external moisture and the moisture of liquid food and, securing the important function of the sealability of packaging material by heat sealing. Consequently, the plastics of the outermost layer and the innermost layer are bonded and sealed by surface fusion in the mutual confronting layers under heating and pressure. Heat sealing realizes a strong and liquid tight sealing junction part mechanically, while forming from packaging material to a packaging container. In order to realize the satisfactory seal, the inside innermost layer is applied by about 15 to 35 g/m$^2$, preferably about 25 to 30 g/m$^2$, and the polyolefine layer of the outermost layer is applied by about 12–20 g/m$^2$, preferably 15–20 g/m$^2$.

The polyolefine layer of the outermost layer of the outside of the completed packaging container is prepared by printing with suitable ornament and/or information for distinguishing the product. A printing ink layer can be laminated on the outside surface of the packaging material un-laminated with the transparence outermost layer, or the external surface of the outermost layer. The ink includes the aqueous or oily ink for flexo printings, the oily ink for gravure, and the hard-enable ink for offset printing.

In the other preferable embodiment of this invention, two or more layers which comprise of the substantially same material as the quality keeping intermediate layer and the innermost layer are laminated, directly or indirectly with an adhesive layer, between the quality keeping intermediate layer laminated inside the paper core layer and the thin innermost layer. In the above-mentioned embodiment, a packaging laminate with excellent non-scalping performance and excellent sealable ability can be offered.

The nylon-MXD6 containing blend polymer has the barrier properties for vitamin C, aroma, and flavor substance, that is, an excellent "aroma barrier" properties, i.e. non-scalping properties.

The packaging laminate of preferable embodiment has the first barrier quality keeping intermediate layer inside the paper board substrate (core layer), and further many barrier layers.

Although a little flavors and aroma substances bleed to the thin product contact layer of packaging material from a contents product, further more bleeding into the package is prevented with the barrier layer of the nylon-MXD6 containing blend polymer. Because of the thin product contact layer, the leakage into the internal product of flavor inhibitors, such as an impurity and a low molecular monomer, can be minimized.

In the preferable packaging laminate, although the heat-sealing layer of the innermost layer is quite thin, when forming laminated packaging material in a packaging container, the defect of any seal is not generated. This is because the heat-sealing layers other than the heat sealable innermost layer are laminated further. In the sealing, it is because the fused barrier layer inside the thin product contact layer penetrates easily, the heat-sealing layer melts and they are used for heat sealing with the fused heat sealable innermost layer.

In the method of manufacturing of the packaging laminate by this invention, preferably, a laminated layer is co-extruded firstly and other polymer layers are laminated by coextrusion in inside of the core layer. In the preferable embodiment of this invention, on the outside of the paper core layer, the heat sealable polymer is coated on the side of the core layer before or after the above co-extruding step. The important advantage of coextrusion is that the heat of the fused polymer is saved in the multilayer extruded film until the fused film of coextrusion coating contacts the substrate (the so-called "inertia of heat"). Therefore, it contributes to the adhesion improved with the substrate. The other advantage saves the expense of the extrusion process step. Therefore, more time saving steps of high cost performance are offered.

In order to obtain sufficient adhesion between a multilayer coextrusion film and a paper-board substrate, before or simultaneously extrusion coating, the surface of the extruded film and/or the surface of the paper-board substrate is activated with pretreatment by the corona, the flame, or ozone.

BEST MODE FOR WORKING INVENTION

Hereafter, the embodiment of this invention is described in detail with reference to drawings.

Figure 1:
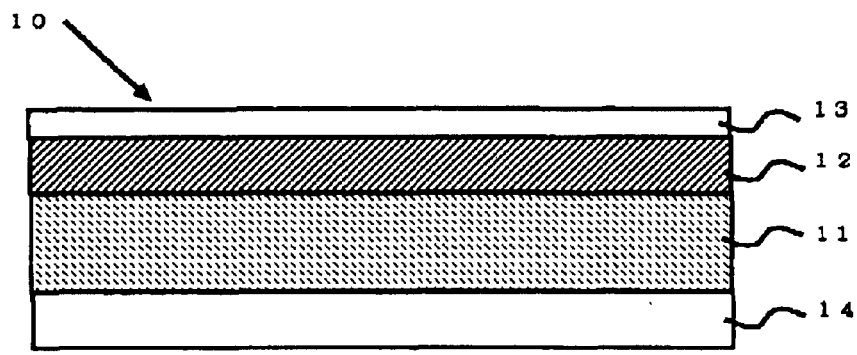
FIG. 1 is a transverse sectional view showing one example of the laminated packaging material according to this invention.

The transverse sectional view referred to in FIG. 1 illustrates the preferable laminated packaging material 10 according to this invention. Although the packaging material 10 is configurationally rigid, packaging material includes the foldable core layer 11 of paper or paperboard. The quality keeping intermediate layer 12 consisting of extrusion coatable blend polymer of polymer component A of nylon-MXD6 or EVOH, and polymer component B of PA-6, PA-66, PA-6/66, or PET is laminated to the inner surface of the core layer 11.

The content of nylon-MXD6 of the polyamide blend is preferably 50 to 95 wt. % and 70 to 80 wt. % most preferably, of the blend. The amounts of coating of this quality keeping intermediate layer's polyamide blend are 5–10 g/m² preferably.

It is proved that the quality keeping intermediate layer 12 comprising extrusion coatable blend polymer by this invention adheres very well the core layer 11 of paper or the paper board. Compared with the packaging material in which the paper core layer is laminated the quality keeping intermediate layer through the intermediate layer of polyethylene, it is proved that an oxygen gas barrier is improved no less than about 30 to 40 percent by direct coating of the quality keeping intermediate layer 12 to the core layer 11.

The heat sealable innermost layer 13 is laminated on the surface of the quality keeping intermediate layer 12 by the opposite side of the core layer 11. On the other hand, the sealable polymer layer 14 is laminated on the core layer 11 by the side of opposite of the quality keeping intermediate layer 12. The heat sealable innermost layer 13 is laminated in the preferably few amount of coatings. Moreover, the sealable polymer layer 14 is LDPE, m-PE, or the blend of these two polymer, for example, is used in the amount of coating of 15 g/m².

Figure 2:
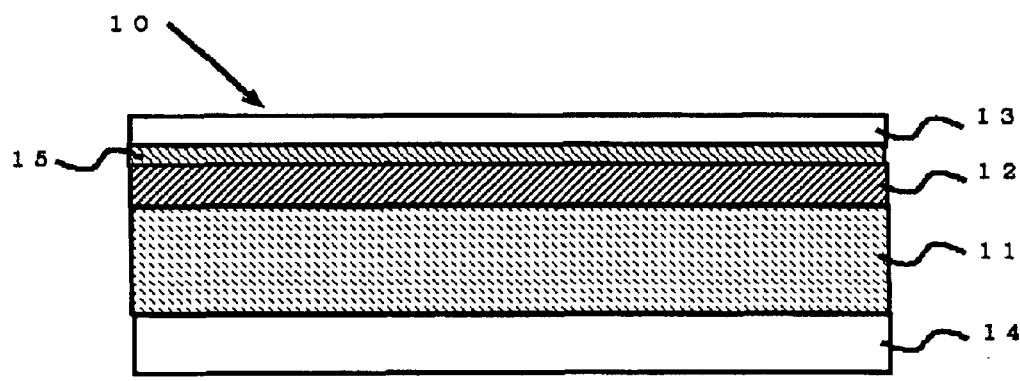
FIG. 2 is a transverse sectional view showing another example of the laminated packaging material according to this invention.

The transverse sectional view referred to in FIG. 2 illustrates the preferable laminated packaging material 10 according to this invention like FIG. 1. The packaging material 10 includes the paper core layer 11. The quality keeping intermediate layer 12 comprising the inner surface of the core layer 11 from the extrusion-coatable blend polymer by this invention is laminated.

In the quality keeping intermediate layer 12 by the side of opposite of the core layer 11, the heat sealable innermost layer 13 is laminated through the adhesion layer 15. On the other hand, the sealable polymer layer 14 is laminated on the core layer 11 by the side of opposite of the quality keeping intermediate layer 12.

The adhesion layer 15 which joins the sealable innermost layer 13 and the quality keeping intermediate layer 12 consists of the polyethylene which is graft-modified by maleic anhydride, and is approximately used in the amount of coating of 3–6 g/m².

Figure 3:
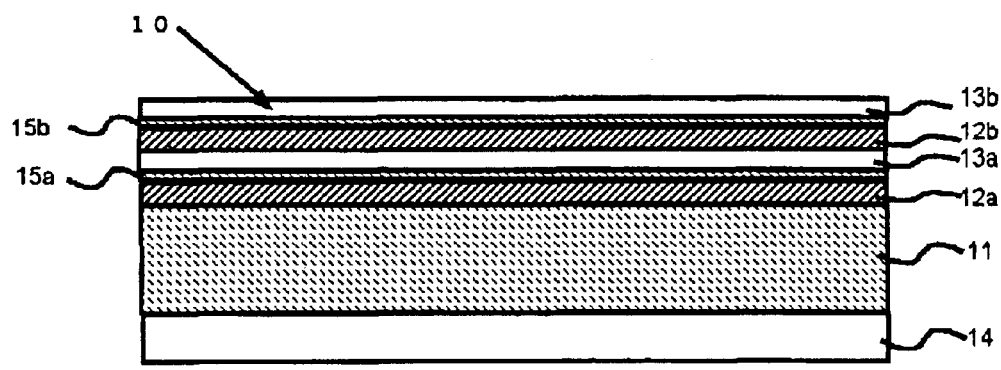
FIG. 3 is a transverse sectional view showing still another example of the laminated packaging material according to this invention.

The transverse sectional view referred to in FIG. 3 illustrates the preferable laminated packaging material 10 by this invention like FIGS. 1 and 2. The packaging material 10 includes the paper core layer 11 also. On the inner surface of the core layer 11, the quality keeping intermediate-layer 12a which comprises of extrusion coatable blend polymer by this invention is laminated.

In quality keeping intermediate-layer 12a by the side of opposite of the core layer 11, heat sealable innermost-layer 13b is laminated through intermediate two or more layers 12b, 13a and 15a, b. On the other hand, the layer 14 of the sealable polymer is laminated in the core layer 11 by the side of opposite of the quality keeping intermediate layer 12.

In the embodiment illustrated in FIG. 3, heat sealable innermost-layer 13b of the same substance as the heat sealable innermost layer, and 2nd quality keeping intermediate-layer 12b of the same substance as quality keeping intermediate-layer 12a are laminated through the adhesion layers 15a and 15b between heat sealable innermost-layer 13b and quality keeping intermediate-layer 12a.

There should be innermost-layer 13b thinly, in order to prevent that the aroma and the flavor substance escape from the contents product into packaging material. The innermost layer is the amount of coating of 6–12 g/m² approximately, is a maximum of 10 g/m² preferably, and is most preferably used in the amount of coating of 6–9 g/m².

The advantage which the laminated packaging material illustrated in FIG. 3 has is as follows:

With the gas and aroma barrier quality keeping intermediate-layer 12a, barrier quality keeping intermediate-layer 12b in the laminate prevents that the aroma and the flavor substance bleed to packaging, material from the contents product. Therefore, the layer thicknesses can be made thin enough. Moreover, heat sealable innermost-layer 13b can compensate the total amount of the heat sealable polymer which is missing by innermost-layer 13b with heat sealable innermost-layer 13b, and the layer thickness of heat sealable innermost-layer 13b of the product contact layer can be made thin. Neither impurities nor the low numerator monomer can be bleeded to the contents product from the product contact layer, but the aroma and flavor of the contents product can be preserved.

Hereafter, the manufacture method of the laminated packaging material by this invention is described.

Figure 4:
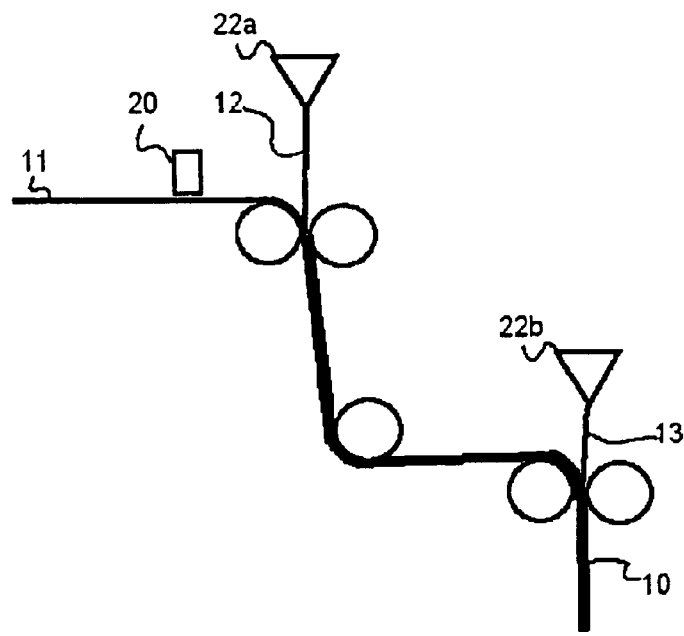
FIG. 4 is an outline figure illustrating schematically the manufacture method of the laminated packaging material shown in FIG. 1.

FIG. 4 is the outline figure illustrating schematically the manufacture method of the laminated packaging material illustrated in FIG. 1.

The web of the core layer 11 of the paperboard substrate passes through the surface activation station 20, and the surface is preferably activated by the corona and/or flame processing by flame processing.

The quality keeping intermediate layer 12 is extruded by generating the film from supply die 22a, and the film which melted hotly is supplied through the nip roll with the paper-board web, and, subsequently to the polymer quality keeping intermediate layer 12, is joined by pressure and the heat. The extruded polymer is fully hot until it contacts the paper-board substrate. Subsequently, the polymer of the innermost layer 13 is extruded by generating the film from supply die 22b, the film which melted still more hotly is supplied through the nip roll with the laminated paper-board web, and the polymer innermost layer 13 is joined by pressure and the heat.

The polyolefine outermost layer 14 is extruded in the core layer of the paper-board web, and is joined by coating dung the extrusion coating process, before the process, or after the process.

Figure 5:
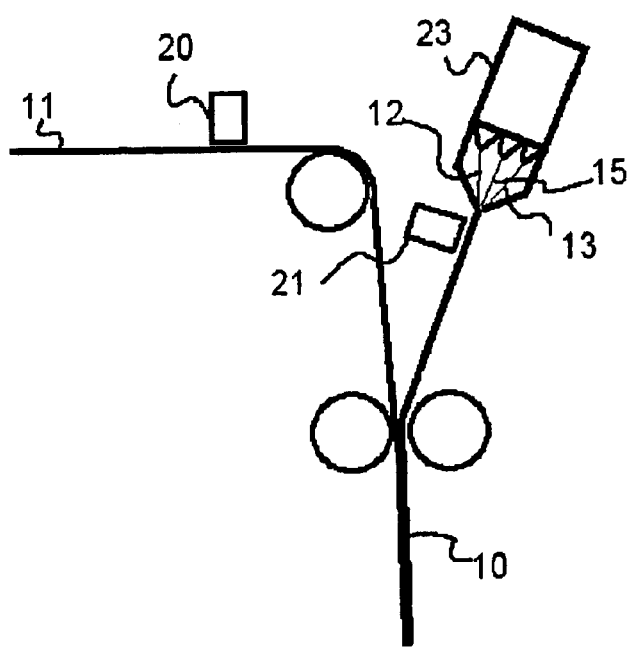
FIG. 5 is an outline figure illustrating schematically the manufacture method of the laminated packaging material illustrated in FIG. 2.

FIG. 5 is the outline figure illustrating schematically the manufacture method of the laminated packaging material illustrated in FIG. 2.

The web of the paper-board substrate core layer 11 passes through the surface activation station 20, and the surface is preferably activated by the corona and/or flame processing by flame processing here. By generating the film having the three layers by the supply block 23, the layers 12, 13, and 14 are coextruded, and the coextrusion film passes through the air gap between the die and the paper-board substrate, and is supplied through the die. Preferably, in the air gap, the surface of the layer 12 led to the paper-board surface is given to ozonization 21, and activation processing is carried out. The multilayer film coextruded and melted still more hotly is supplied through the nip roll with the paper-board web, and laminated with pressure and the heat. It is desirable to make it warm enough until the film arrives in the contact to the paper-board substrate.

The polyolefine outermost layer 14 can be extruded on the side of the core layer of the paper-board web, and can be attached by coating during the extrusion coating process, before the process, or after the process.

Figure 6:
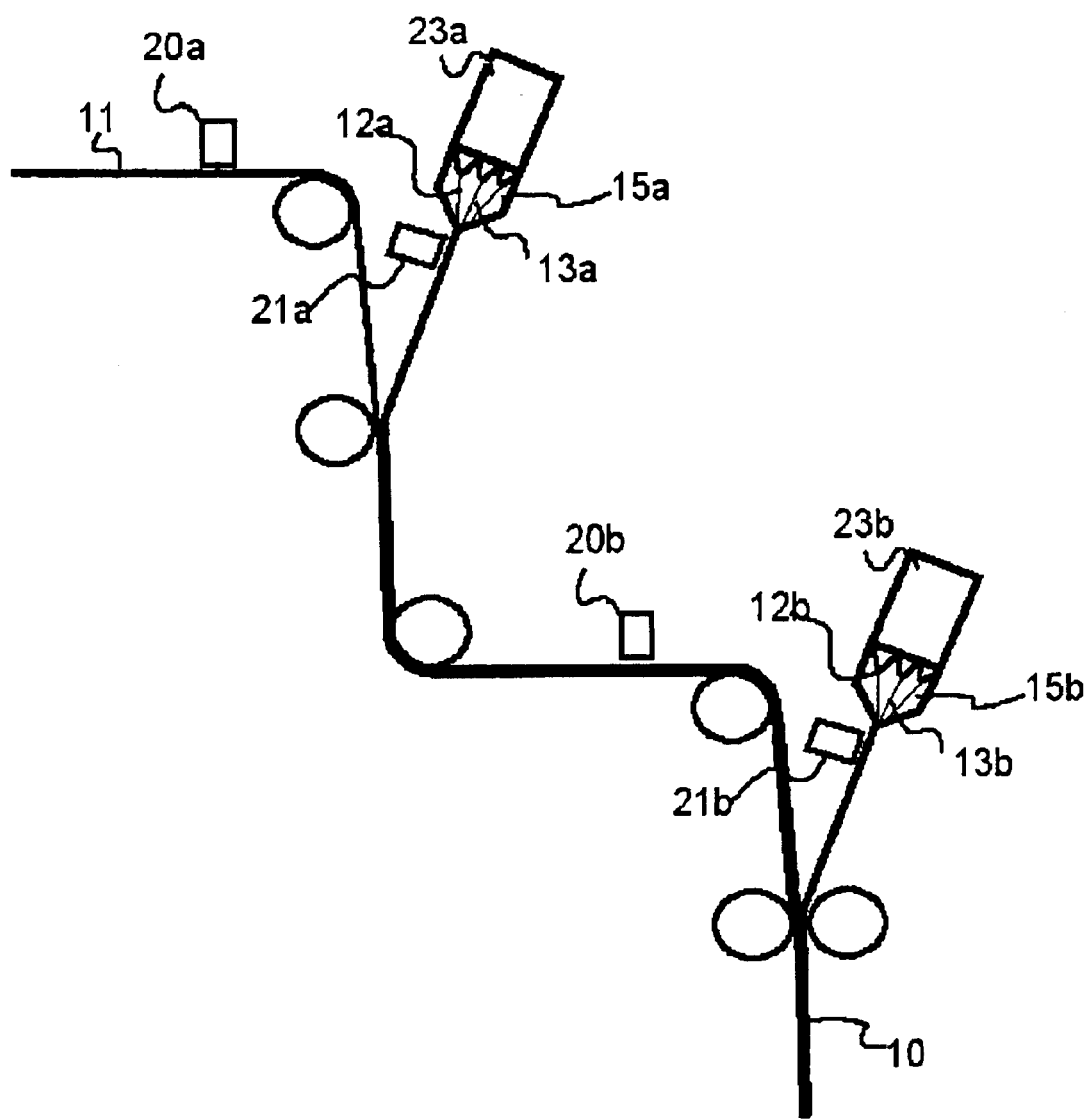
FIG. 6 is an outline figure illustrating schematically the manufacture method of the laminated packaging material illustrated in FIG. 3.

FIG. 6 is the outline figure illustrating schematically the manufacture method of the laminated packaging material illustrated in FIG. 3. It is possible to realize laminated structure of the six layers, not only three-layers structure in FIG. 5 inside core layer 11, in this invention.

As Illustrated in FIG. 6, the web of the paper-board substrate core layer 11 passes surface activation station 20a, and the surface is preferably activated by the corona and/or flame processing by flame processing.

By generating the three layer film by supply block 23a, the layers 12a, 13a, and 15a are coextruded, and the coextrusion film passes through the air gap between the die and the paper-board substrate, and is supplied through the die. Preferably, in the air gap, the surface of layer 12a led to the paper-board surface is given to ozonization 21a, and activation processing is carried out. The multilayer film coextruded and melted still more hotly is supplied through the nip roll with the paper-board web, and is lamianted by pressure and heat.

Then, the layers 12b, 13b, and 15b as a three layer film are coextruded by supply block 23b, and the coextrusion film passes through the air gap between the die and the paper-board substrate, and is supplied through the die. In the air gap, the surface of layer 12b led to the paper-board surface is given to ozonization 21b, and activation processing is carried out. The multilayer film coextruded and melted still more hotly is supplied through the nip roll with the paper-board web, and pressure and the heat laminate these.

The polyolefine outermost layer 14 can be extruded in the core layer of the paperboard web, and can be laminated during the extrusion coating process, or before or after the process.

In the liquid food packaging field, the brick shape container obtained by inner tube shape forming of the web-like package material of the packaging material of this invention, filling of the fruit juice, the tea, and liquid dairy products into inner tube-like package material, the transversal seal to the transversal direction of inner tube-like package material, and cutting of the package material in a transversal-seal part and, the container of the gable top shape obtained with cutting of paper package material, formation of the blanks which sealed longitudinally, the seal of the bottom of a blanks, filling of the liquid product from opening, and the top seal are used.

The examples given above are only illustration of the container for packaging by this invention. This invention is not limited by the illustration.

Furthermore, the paper packaging container obtained from the packaging material of this invention can also be fabricated by containers, such as a one-piece type, a two-pieces type, and a three-pieces type, a composite can, an insert forming container, the double container, etc. The paper packaging container is obtained with the punch by the predetermined shape of package material, crease line formation, bending of a crease line, and a seal. The seal method includes heat sealing, a flame seal, a hot air seal, an ultrasonic seal, a high frequency seal, etc.

In a filling machine, the laminated packaging material is supplied as a roll shape, a sleeve shape, or a cup shape, and the paper packaging container is obtained by filling of a liquid product, and sealing.

The container for packaging concerning this invention is filled with liquid products, such as cow's milk, a lactic-acid-bacteria drink, liquid soup, a fruit-juice drink, barley tea, green tea, oolong tea, liquor, a seasoning, medical supplies, cosmetics, a coating material, adhesives, ink, etching liquid, and others, and is preferably filled with liquid food.

EXAMPLE

Example 1

The low density polyethylene (density=0.920 g/cm$^3$, MI=5.1) by the high pressure process is extrusion coated by 330 degrees C. of extrusion temperatures on a paper substrate (amount=of coatings 320 g/m²) by 20 micrometers in thickness, and an outside thermoplastic material layer is laminated. Then, the inside back of the paper substrate is activated by the flame treatment of the surface-activating processing station 20 with the manufacturing installation shown in FIG. 4. On the downstream of the surface-activating processing station, the fused blend polymer of 80 wt. % nylon-MXD6 and 20 wt. % nylon 6, is extruded on the inside back surface of the surface-activated paper substrate from supply die 22a, and the quality keeping intermediate layer is formed on the back surface to the paper substrate. As for the used blend polymer, two peaks are shown by the differential scanning calorimetry. In order to obtain the blend with which two phases do not mix, i.e., the blend in which two melting points are shown in DSC measurement, the polymer is blended with low melting point, short blend time and low shear force of the kneading step. Actually, various polymer granules are dry blended, and the fused polymer is mixed in extruder during supplying from the extruding die. The two phases blend gives an oxygen barrier properties more excellent than the one-phase blend.

The film immediately after extruding is hot enough, and can be easily sealed by the nip roll. Then, the sealable innermost layer of mLLDPE having the mean density of 0.920, the 116-degree C. peak melting point by the differential scanning calorimetry, the melt flow index of 10, and the swelling ratio of 1.5 is laminated by the 25 micrometer layer thickness to the laminated quality keeping intermediate-layer side.

The swelling ratio is a ratio of the diameter and the diameter of the die of the polymer extruded from the die of the MFR measuring apparatus used for the flow examining JIS method of thermoplastics.

The laminated packaging material is punched to the blank board for paper packaging containers with crease lines, and, subsequently a sleeve is manufactured with the seal of both edges of the blank board. Next, in the liquid food filling machine, heat-sealing of the bottom of a sleeve is carried out, liquid products are filled from top opening, heat-sealing of the top is carried out, and a gable top shape packaging product is manufactured.

The "oxygen permeability", "bulging", "on-scalping", and the "temperature dependency of seal" of the obtained packaging container are evaluated.

When filled with green tea, orange gas and cow's milk, the "oxygen permeability" is measured about gradual change of relative humidity.

In the "bulging" test, the bulging of the container after 4-degree-C. chilled storage for ten weeks is measured about ten 1 liter gable top paper containers filled by orange juice.

When filled with green tea and orange juice, the "non-scalping" of the container of three weeks and two-month storage is measured about gradual change of relative humidity.

The "temperature dependency of seal" is evaluated by observation of the seal influence by seal atmosphere temperature about the temperature change of content product.

Example 2

Except for the following, the package material and its paper packaging container are produced like Example 1. Instead of mLLDPE of the sealable innermost layer of Example 1, the blend with the linear low density polyethylene (mLLDPE) of the narrow molecular weight distribution which polymerized with the metallocene catalyst, and the low density polyethylene by the high pressure process is used, and the blend polymer which has the properties parameter of the mean density of 0.925, the 118-degree C. peak melting point by the differential scanning calorimetry, the melt flow index of 11, swelling ratio of 1.5, and 35-micrometer layer thickness is used. With manufacturing apparatus shown in FIG. 5, a heat sealable innermost layer and a quality keeping intermediate layer are coextruded through the adhesive layer which consists of the polyethylene which maleic anhydride graft modified. Furthermore, the paper packaging container obtained and packaging filling are similarly estimated as Example 1.

Example 3

As the quality keeping intermediate layer, package material and a paper packaging container are produced like. Example 2 except using blend polymer of 70 wt. % nylon-MXD6, and 30 wt. % of PA6 nylon clay hybrid. Furthermore, the paper packaging container obtained and packaging filling are similarly estimated as Example 1.

Comparative example 1

Package material and a paper packaging container are produced like Example 1 except using the low density polyethylene (density=0.923, MFI=4, the 113-degree C. peak melting point by the differential scanning calorimetry, 1.8 swelling ratios) by the high pressure process instead of mLLDPE of the sealable innermost layer of Example 1. Furthermore, the paper packaging container obtained and packaging filling are similarly estimated as Example 1.

Comparative example 2

Package material and a paper packaging container are produced like Example 2 except using amorphous polyamide (PA3508 made from Selar) as a quality keeping intermediate layer. Furthermore, the paper packaging container obtained and packaging filling are similarly estimated as Example 1.

Comparative example 3

As a quality keeping intermediate layer, it is nylon. —Package material and a paper packaging container are produced like an example 2 except using MXD6 (Ube Industries, Grade 1024b). Furthermore, the paper packaging container obtained and packaging filling are similarly estimated as Example 1.

Examples 1, 2, and 3 and Comparative examples 1, 2, and 3 are evaluated about the above-mentioned "oxygen permeability", the "temperature dependency of seal", the "non-scalping", and the "bulging." As the result, it is shown that examples are superior to comparative examples.

Conclusively, it is shown from comparison with Example 2 and Comparative example 2 that the mixture of nylon-MXD6/PA6 has oxygen barrier properties more excellent than amorphous PA. Moreover, comparison with Example 2 and Example 3 shows that the blend of PA6 nylon clay hybrid and nylon-MXD6 has oxygen barrier properties more excellent than the nylon: PA6-MXD6-blend.

At Comparative example 3, an excellent gas barrier value is acquired in the 100% nylon-MXD6 gas barrier layer. However, since crack and exfoliation happen in the gas barrier layer, and with the packaging container oxygen penetrates, the laminate cannot actually be used.

In the case where filling liquid food is green tea in Examples, under preservation conditions of 4–5 degrees C.

and 90% RH, any increase of the liquid products of after three weeks and two months on oxygen concentration is not observed. Moreover, there is no generating of foreign matters, such as mold, and the fall of a flavor, flavor and other abnormalities are not seen. Similarly, when liquid food is orange juice, the result of the same evaluation is good. There is no generating of foreign matters such as mold, and the fall of flavor and other abnormalities are not accepted.

Tough seal hardness is obtained in Examples. In the case of 70–80 degrees C. high temperature filling liquid food (green tea) and 3–6 degrees C. low-temperature packaging (cow's milk), influence is not received in the temperature of filling contents, but an excellent seal is obtained in wide range temperature.

This invention shows the following advantages so that the above-mentioned Examples may prove.

To the paper core layer, two or more fundamental layers can be laminated with the practical extrusion coating. Therefore, the packaging laminated material excellent in the non-scalping and the gas barrier is offered by effective (efficient) packaging laminated material manufacture (converting).

An excellent seal is realized in the range with wide seal temperature from high temperature to low temperature. Therefore, easy filling packaging to paper packaging container, quick heat sealing, excellent seal that does not receive influence in the temperature of the filling content, and quality keeping paper packaging laminated material are offered.

Furthermore, extrusion coating, high cost performance, the outstanding mechanical hardness, lightening of the paper core layer, low environmental load, and the laminated packaging material heat-sealable in the wide temperature range are offered.

Industrial Availability

Filling packaging of for example, liquid products, such as cow's milk, a lactic-acid-bacteria drink, liquid soup, a fruit-juice drink, barley tea, green tea, oolong tea, liquor, a seasoning, medical supplies, cosmetics, a coating material, adhesives, ink, etching liquid, and others, is applicable by using the laminate of this invention. Preferably, the laminate of this invention is formed to the paper container for the above-mentioned liquid food (containers, such as one-piece type, two-pieces type, and three-pieces type), composite can, the multi-container, etc.

What is claimed is:

1. A laminated material for food packaging which comprises;

at least a paper core layer;

a quality keeping intermediate layer; and a heat sealable innermost layer;

the quality keeping intermediate layer comprising an extrusion coatable blend polymer containing 50–95% of polymer component A of condensation polymer (nylon-MXD6) of meta-xylene diamine and abipic acid or ethylene vinyl alcohol copolymer (EVOH), 5–50% of polymer component B of nylon-6 (PA-6), nylon-66 (PA-66), blend (PA-6/66) with nylon-6 and nylon-66 or polyethylene terephthalate (PET);

the quality keeping intermediate layer being immediately adjacent the core layer; and the innermost layer consisting of a blend of metallocene LLDPE and linear low density polyethylene which blend has a narrow molecular weight distribution, and has a mean density of 0.910–0.925, a 100–122 degrees C. peak melting point, a melt flow index of 5–20, a swelling ratio (SR) of 1.4–1.6, and a 5–50-micrometer layer thickness and which is a thin layer of 6–12 g/m$^2$ of the blend.

2. The laminated material for packaging according to claim 1, wherein the blend polymer of the quality keeping intermediate layer comprises the polymer component A of nylon-MXD6 and the polymer component B of nylon 6 (PA-6), nylon-66 (PA-66) or the blend (PA-6/66) with nylon 6 and nylon 66.

3. The laminated material for packaging according to claim 2, wherein the blend polymer of the quality keeping intermediate layer comprises 70 to 80 wt. % of nylon-MXD6, and 30 to 20 wt. % of nylon 6.

4. The laminated material for packaging according to claim 1, wherein a layer of substantially same substance as the quality keeping intermediate layer and a layer of substantially the same substance as the innermost layer are laminated, either directly or indirectly, between the quality keeping intermediate layer and the innermost layer by way of an adhesive layer.

5. The laminated material for packaging according to claim 1, wherein the polymer component B is a composite including polyamide of PA-6, PA-66 or PA-6/66 and fine phyllosilicate dispersed uniformly into the polyamide.

6. A method of manufacturing a laminated material for food packaging which comprises at least a paper core layer, a quality keeping intermediate layer laminated inside the core layer and a heat sealable innermost layer, the method comprising:

extrusion-coating directly on the core layer the quality keeping intermediate layer comprised of a blend polymer of polymer component A 50–95% of condensation polymer (nylon-MXD6) of meta-xylene diamine and abipic acid and, polymer component B 5–50% of nylon-6 (PA-6) or nylon-66 (PA-66) or a blend (PA-6/66) with nylon-6 and nylon-66 to laminate the quality keeping intermediate layer to the core layer; and coextruding a heat sealable polymer forming the heat sealable innermost layer simultaneously with said blend polymer or extruding the heat sealable polymer after the extrusion coating of the blend polymer to laminate the heat sealable innermost layer; the heat sealable polymer consisting of a blend of metallocene LLDPE and linear low density polyethylene which blend has a narrow molecular weight distribution, and has a mean density of 0.910–0.925, a 100–122 degree C. peak melting point, a melt flow index of 5–20, a swelling ratio (SR) of 1.4–1.6, and a 5–35-micrometer layer thickness.

7. The method of manufacturing a laminated material for food packaging according to claim 6, wherein the laminated material for food packaging has the core layer of paper or paper board, and the quality keeping intermediate layer of the blend polymer including the condensation polymer (nylon-MXD6) of meta-xylene diamine and abipic acid and nylon 6 (PA-6), and the quality keeping intermediate layer being laminated to the surface of the core layer with the heat sealable innermost layer by coextrusion coating.

8. The method of manufacturing a laminated material for food packaging according to claim 6, wherein the quality keeping intermediate layer is directly extrusion-coated to the core layer made of paper or paper board by co-extruding with the heat sealable polymer without any intermediate lamination and without any adhesive layer.

9. The method of manufacturing a laminated material for food packaging according to claim 6, wherein an adhesive polymer is co-extruded between the heat sealable innermost layer and the quality keeping intermediate layer during coextrusion of the heat sealable innermost layer and the quality keeping intermediate layer.

10. The method of manufacturing a laminated material for food packaging according to claim 6, wherein a surface of the core layer to which the quality keeping intermediate layer is laminated is activated by corona treatment or flame treatment before extrusion-coating the quality keeping intermediate layer.

11. The method of manufacturing a laminated material for food packaging according to claim 6, wherein a contact surface of an extruded film is activated by corona treatment or flame treatment before extrusion-coating the quality keeping intermediate layer.

* * * * *